(12) United States Patent
Hong

(10) Patent No.: US 11,770,750 B2
(45) Date of Patent: Sep. 26, 2023

(54) METHODS OF OBTAINING AND SENDING PATH INFORMATION OF UNMANNED AERIAL VEHICLE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 422 days.

(21) Appl. No.: 17/052,607

(22) PCT Filed: May 10, 2018

(86) PCT No.: PCT/CN2018/086358
§ 371 (c)(1),
(2) Date: Nov. 3, 2020

(87) PCT Pub. No.: WO2019/213908
PCT Pub. Date: Nov. 14, 2019

(65) Prior Publication Data
US 2021/0243665 A1    Aug. 5, 2021

(51) Int. Cl.
*H04W 4/00*    (2018.01)
*H04W 36/32*    (2009.01)
(Continued)

(52) U.S. Cl.
CPC ........... *H04W 36/32* (2013.01); *B64C 39/024* (2013.01); *H04B 7/18506* (2013.01);
(Continued)

(58) Field of Classification Search
CPC ....... H04W 36/32; H04W 8/24; H04W 76/27; H04W 36/16; H04W 84/06; B64C 39/024; H04B 7/18506; B64U 2201/10
(Continued)

(56) References Cited

U.S. PATENT DOCUMENTS 7,522,906 B2 *   4/2009   Whelan ............... H04W 48/02
                                                        455/418
8,693,947 B2 *   4/2014   Silny ..................... H04B 7/195
                                                        455/12.1
(Continued)

FOREIGN PATENT DOCUMENTS

CN    102761862 A    10/2012
CN    103907365 A     7/2014
(Continued)

OTHER PUBLICATIONS

European Patent Office, Extended European Search Report Issued in Application No. 18918340.3, Apr. 21, 2021, 10 pages.
(Continued)

*Primary Examiner* — Amancio Gonzalez
(74) *Attorney, Agent, or Firm* — Finnegan, Henderson, Farabow, Garrett & Dunner, L.L.P.

(57) ABSTRACT

The present disclosure relates to a method of obtaining path information of an unmanned aerial vehicle (UAV). The method is applicable to a base station, and includes: receiving indication information from the UAV, where the indication information indicates whether the UAV has a capability of sending the path information; if the UAV has the capability of sending the path information according to the indication information, sending configuration information to the UAV, where the configuration information indicates whether the UAV is allowed to send the path information to the base station; and if the UAV is allowed to send the path information to the base station, receiving the path information from the UAV. According to examples of the present disclosure, the base station successfully receives the path information from the UAV.

20 Claims, 8 Drawing Sheets

Receive indication information from a UAV, where the indication information indicates whether the UAV has a capability of sending path information — S11

If the UAV has the capability of sending the path information according to the indication information, send configuration information to the UAV, where the configuration information indicates whether the UAV is allowed to send the path information to the base station — S12

If the UAV is allowed to send the path information to the base station, receive the path information from the UAV — S13

(51) Int. Cl.
*H04W 76/27* (2018.01)
*B64C 39/02* (2023.01)
*H04B 7/185* (2006.01)
*H04W 8/24* (2009.01)

(52) U.S. Cl.
CPC ............ *H04W 8/24* (2013.01); *H04W 76/27* (2018.02); *B64U 2201/10* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 9,836,047 | B2* | 12/2017 | Clark | G08G 5/0034 |
| 10,023,311 | B2* | 7/2018 | Lai | B64C 39/024 |
| 10,133,281 | B1* | 11/2018 | Tu | G05D 1/106 |
| 10,148,343 | B2* | 12/2018 | Shaw | H04W 84/005 |
| 10,153,830 | B2* | 12/2018 | Kosseifi | B64C 39/024 |
| 10,155,586 | B2* | 12/2018 | Liu | B64C 39/024 |
| 10,476,296 | B1* | 11/2019 | Rausch | B64C 39/024 |
| 10,667,189 | B2* | 5/2020 | Hahn | H04W 36/0088 |
| 10,701,549 | B2* | 6/2020 | Basu Mallick | H04W 4/023 |
| 10,772,018 | B2* | 9/2020 | Yeh | H04L 43/16 |
| 10,798,673 | B2* | 10/2020 | Khoryaev | H04W 4/021 |
| 10,827,502 | B2* | 11/2020 | Basu Mallick | H04W 72/51 |
| 10,966,226 | B2* | 3/2021 | Feng | H04W 4/46 |
| 11,029,707 | B2* | 6/2021 | Sasao | G08G 5/006 |
| 11,070,996 | B2* | 7/2021 | Cho | H04W 24/10 |
| 11,129,067 | B2* | 9/2021 | Kim | H04W 36/00835 |
| 11,191,037 | B2* | 11/2021 | Balasubramanian | H04W 52/325 |
| 11,212,716 | B2* | 12/2021 | Yiu | H04W 8/24 |
| 11,337,116 | B2* | 5/2022 | Aydin | B64C 39/024 |
| 11,343,720 | B2* | 5/2022 | Thomas | H04W 36/08 |
| 11,350,322 | B2* | 5/2022 | Ökvist | H04W 36/0058 |
| 11,374,649 | B2* | 6/2022 | Hong | H04W 72/51 |
| 11,381,988 | B2* | 7/2022 | Zhang | H04W 72/0453 |
| 11,595,977 | B2* | 2/2023 | Feng | H04W 72/23 |
| 2011/0084162 | A1* | 4/2011 | Goossen | B64D 1/22 244/135 C |
| 2014/0222248 | A1* | 8/2014 | Levien | G05D 1/104 701/2 |
| 2015/0105062 | A1 | 4/2015 | Quan et al. | |
| 2017/0142575 | A1 | 5/2017 | Quan et al. | |
| 2017/0311290 | A1 | 10/2017 | Adjakple et al. | |
| 2020/0192348 | A1* | 6/2020 | Koziol | H04W 36/0033 |
| 2020/0259900 | A1* | 8/2020 | Xiong | G06F 3/062 |
| 2020/0302799 | A1* | 9/2020 | Hong | G08G 5/0082 |
| 2020/0344661 | A1* | 10/2020 | Hong | G08G 5/003 |
| 2021/0225174 | A1* | 7/2021 | Poscher | G08G 5/006 |
| 2021/0241634 | A1* | 8/2021 | Sarim | G08G 5/0073 |
| 2021/0287557 | A1* | 9/2021 | Matsuki | A62B 33/00 |
| 2021/0321311 | A1* | 10/2021 | Lu | H04W 36/0061 |

FOREIGN PATENT DOCUMENTS

| | | |
|---|---|---|
| CN | 104053197 A | 9/2014 |
| CN | 107371152 A | 11/2017 |
| EP | 2 858 452 A1 | 4/2015 |
| JP | 2020521357 A | 7/2020 |
| RU | 2554517 C2 | 2/2015 |
| WO | WO 2012/146132 A1 | 11/2012 |
| WO | WO 2018/201472 A1 | 11/2018 |

OTHER PUBLICATIONS

ISA State Intellectual Property Office of the People's Republic of China, Written Opinion of the International Searching Authority Issued in Application No. PCT/CN2018/086358, dated Jan. 22, 2019, WIPO, 9 pages.

Office Action issued in Russian Application No. 2020139946, dated May 31, 2021.

Huawei et al.: "Discussion on flight path information", 3GPP TSG-RAN WG2 Meeting #10bis, R2-1805125, Sanya, China, Apr. 16-20, 2018, 4 pages.

Nokia et al.: "Potential mobility enhancements for UAVs", 3GPP TSG-RAN WG2 #99bis, R2-1711445, Prague, Czech Republic, Oct. 9-13, 2017, 2 pages.

Ericsson: "Proposal to progress LTE_Aerial-Core", 3GPP TSG-RAN WG2 #101bis, Tdoc R2-1806347, Sanya, China, Apr. 16-20, 2018, 10 pages.

State Intellectual Property Office of the People's Republic of China, Office Action and Search Report Issued in Application No. 201880000656X, dated Apr. 15, 2019, 19 pages.

State Intellectual Property Office of the People's Republic of China, Office Action and Search Report Issued in Application No. 201880000656X, dated Jan. 3, 2020, 19 pages.

ISA State Intellectual Property Office of the People's Republic of China, International Search Report Issued in Application No. PCT/CN2018/086358, dated Jan. 22, 2019, WIPO, 4 pages.

Request for the Submission of an Opinion for Korean Application No. 10-2020-7034867, dated Jun. 20, 2022.

Examination Report for Indian Application No. 202047052726, dated Dec. 28, 2021.

Notice of Reasons for Refusal for Japanese Application No. 2020-562136, dated Dec. 17, 2021.

Notification of Reason for Refusal for Korean Application No. 10-2020-7034867, dated Nov. 29, 2021.

Fraunhofer HHI, Fraunhofer IIS, "Flight Path Information Report: Trigger and Content", 3GPP TSG-WG2 Meeting #102, R2-1807212, Busan, Korea, May 21-25, 2018, 6 pages.

Huawei, HiSilicon, "Introduction of flight path for Aerial Vehicles for TS 36.331", 3GPP TSG-RAN WG2 #101, R2-1802659, Athens, Greece, Feb. 26-Mar. 2, 2018, 3 pages.

* cited by examiner

METHODS OF OBTAINING AND SENDING PATH INFORMATION OF UNMANNED AERIAL VEHICLE

CROSS REFERENCE TO RELATED APPLICATIONS

This application is a national phase application based on International Application No. PCT/CN2018/086358, filed May 10, 2018, the content of which is incorporated herein by reference.

TECHNICAL FIELD

The present application relates to the technical field of communication, and in particular, to methods of obtaining path information of an unmanned aerial vehicle (UAV), apparatuses for obtaining path information of a UAV, methods of sending path information of a UAV, apparatuses for sending path information of a UAV, electronic devices, and computer readable storage media.

BACKGROUND

With the development of UAV technologies, cost reduction and function improvement, UAVs are increasingly used in the lives of ordinary consumers. The UAVs are currently applied in the fields of aerial photography, transportation, agriculture, plant protection, surveying and mapping, news reporting, rescue, electric power inspection, etc.

UAVs have more and more functions, and can even communicate with base stations. However, contents of the communication are not determined, and the related art does not provide an appropriate way for a UAV sending its own path information to a base station.

SUMMARY

In view of this, the present disclosure provides methods of obtaining path information of a UAV, apparatuses for obtaining path information of a UAV, methods of sending path information of a UAV, apparatuses for sending path information of a UAV, electronic devices and computer readable storage media.

According to a first aspect of examples of the present disclosure, a method of obtaining path information of a UAV is provided. The method is applicable to a base station, and includes:

receiving indication information from a UAV, where the indication information indicates whether the UAV has a capability of sending path information;

if the UAV has the capability of sending the path information according to the indication information, sending configuration information to the UAV, where the configuration information indicates whether the UAV is allowed to send the path information to the base station; and if the UAV is allowed to send the path information to the base station, receiving the path information from the UAV.

Optionally, the method further includes:

determining, according to the path information, another base station corresponding to a cell to be traversed by the UAV; and sending first preparation information to the UAV, where the first preparation information includes information required for the UAV establishing a communication connection with the other base station.

Optionally, the method further includes:

determining, according to the path information, another base station corresponding to a cell to be traversed by the UAV; and sending second preparation information to the other base station, where the second preparation information instructs the other base station to prepare for establishing a communication connection with the UAV.

Optionally, the configuration information further indicates a parameter of a mode in which the UAV sends the path information to the base station.

Optionally, the configuration information is included in RRCConnectionReconfiguration signaling.

Optionally, the configuration information is included in an OtherConfig information element of the RRCConnectionReconfiguration signaling.

According to a second aspect of the examples of the present disclosure, a method of sending path information of a UAV is provided. The method is applicable to the UAV, and includes:

sending indication information to a base station, where the indication information indicates whether the UAV has a capability of sending path information;

if the UAV has the capability of sending the path information, receiving configuration information from the base station, where the configuration information indicates whether the UAV is allowed to send the path information to the base station; and if the UAV is allowed to send the path information to the base station, and in a case that the path information is to be sent to the base station, sending the path information to the base station.

Optionally, the path information includes pre-stored path information.

Optionally, the path information includes path information received from a controller.

Optionally, the method further includes:

receiving first preparation information from the base station, where the first preparation information includes information required for the UAV establishing a communication connection with another base station which corresponds to a cell to be traversed by the UAV.

Optionally, the configuration information further indicates a parameter of a mode in which the UAV sends the path information to the base station, and sending the path information to the base station includes:

sending the path information to the base station according to the parameter of the mode.

Optionally, the indication information is included in UE-EUTRA-Capability signaling.

Optionally, the indication information is included in an OtherParameters information element of the UE-EUTRA-Capability signaling.

Optionally, the path information is included in UEAssistanceInformation signaling.

Optionally, the path information is included in a FlightPathInformation information element of the UEAssistanceInformation signaling.

According to a third aspect of the examples of the present disclosure, an apparatus for obtaining path information of a UAV is provided. The apparatus is applicable to a base station, and includes:

a first receiving module configured to receive indication information from a UAV, where the indication information indicates whether the UAV has a capability of sending path information;

a first sending module configured to, if the UAV has the capability of sending the path information according to the indication information, send configuration information to the UAV, where the configuration information indicates whether the UAV is allowed to send the path information to the base station; and a second receiving module configured to, if the UAV is allowed to send the path information to the base station, receive the path information from the UAV.

Optionally, the apparatus further includes:

a base station determining module configured to determine, according to the path information, another base station corresponding to a cell to be traversed by the UAV; and a second sending module configured to send first preparation information to the UAV, where the first preparation information includes information required for the UAV establishing a communication connection with the other base station.

Optionally, the apparatus further includes:

a base station determining module configured to determine, according to the path information, another base station corresponding to a cell to be traversed by the UAV; and a third sending module configured to send second preparation information to the other base station, where the second preparation information instructs the other base station to prepare for establishing a communication connection with the UAV.

Optionally, the configuration information further indicates a parameter of a mode in which the UAV sends the path information to the base station.

Optionally, the configuration information is included in RRCConnectionReconfiguration signaling.

Optionally, the configuration information is included in an OtherConfig information element of the RRCConnectionReconfiguration signaling.

According to a fourth aspect of the examples of the present disclosure, an apparatus for sending path information of a UAV is provided. The apparatus is applicable to the UAV, and includes:

an indication sending module configured to send indication information to a base station, where the indication information indicates whether the UAV has a capability of sending path information;

a configuration receiving module configured to, if the UAV has the capability of sending the path information, receive configuration information from the base station, where the configuration information indicates whether the UAV is allowed to send the path information to the base station; and a path sending module configured to, if the UAV is allowed to send the path information to the base station, and in a case that the path information is to be sent to the base station, send the path information to the base station.

Optionally, the path information includes pre-stored path information.

Optionally, the path information includes path information received from a controller.

Optionally, the apparatus further includes:

a preparation receiving module configured to receive first preparation information from the base station, where the first preparation information includes information required for the UAV establishing a communication connection with another base station which corresponds to a cell to be traversed by the UAV.

Optionally, the path sending module is configured to send the path information to the base station according to a parameter of a mode.

Optionally, the indication information is included in UE-EUTRA-Capability signaling.

Optionally, the indication information is included in an OtherParameters information element of the UE-EUTRA-Capability signaling.

Optionally, the path information is included in UEAssistanceInformation signaling.

Optionally, path information is included in a FlightPath-Information information element of the UEAssistanceInformation signaling.

According to a fifth aspect of the examples of the present disclosure, an electronic device is provided, the device includes:

a processor, and a memory for storing instructions executable by the processor, where the processor is configured to perform steps in the method of obtaining the path information of the UAV according to any one of the examples as described above.

According to a sixth aspect of the examples of the present disclosure, there is provided an electronic device, including:

a processor; and a memory for storing instructions executable by the processor, where the processor is configured to perform steps in the method of sending the path information of the UAV according to any one of the examples as described above.

According to a seventh aspect of the examples of the present disclosure, there is provided a computer readable storage medium storing a computer program, where the program is executed by a processor to perform steps in the method of obtaining the path information of the UAV according to any one of the examples as described above.

According to an eighth aspect of the examples of the present disclosure, there is provided a computer readable storage medium storing a computer program, where the program is executed by a processor to perform steps in the method of sending the path information of the UAV according to any one of the examples as described above.

According to the examples of the present disclosure, the UAV sends the indication information to the base station, such that the base station determines whether the UAV has the capability of sending the path information. In a case that the UAV has the capability of sending the path information, the configuration information is sent to the UAV indicating whether the UAV is allowed to send the path information to the base station. Further, in a case that the UAV is allowed to send the path information to the base station, the base station receives the path information from the UAV. Thus, the base station can successfully receive the path information from the UAV.

BRIEF DESCRIPTION OF THE DRAWINGS

To describe the technical solutions in examples of the present disclosure more clearly, drawings required in descriptions of the examples will be briefly introduced below. It is apparent that the drawings described below are merely examples of the present disclosure and other drawings may be obtained by those of ordinary skill in the art based on these drawings.

DETAILED DESCRIPTION OF THE EMBODIMENTS

The technical solutions in examples of the present disclosure will be described clearly and completely with reference to the accompanying drawings thereof. Apparently, the described examples are merely a part of the examples of the present disclosure, rather than all of the examples. Based on the examples of the present disclosure, all other examples obtained by those of ordinary skill in the art without creative work shall fall within the protection scope of the present disclosure.

Figure 1:
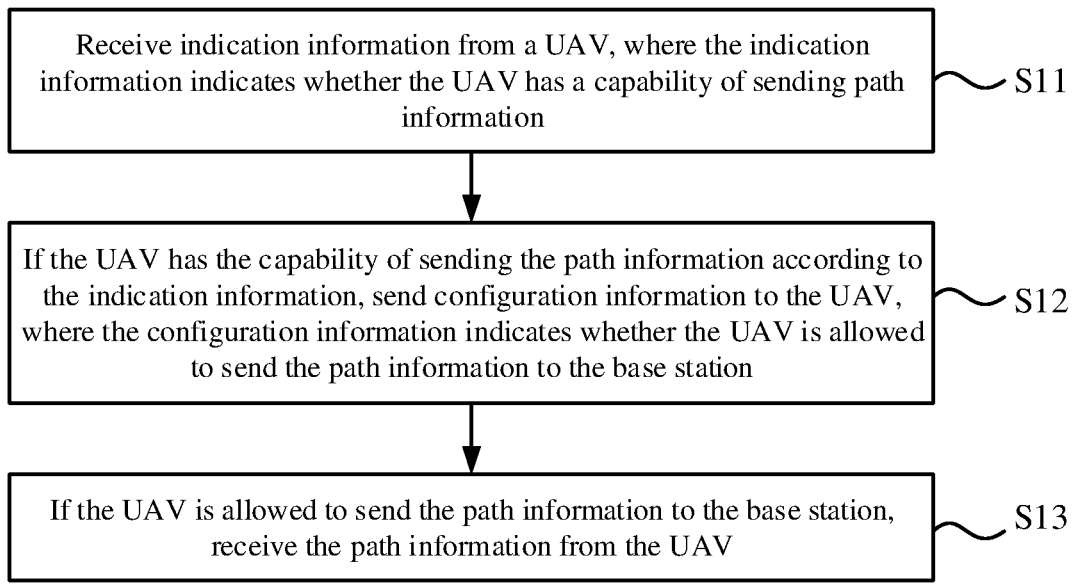
FIG. 1 is a schematic flowchart illustrating a method of obtaining path information of a UAV according to an example of the present disclosure.

FIG. 1 is a schematic flowchart illustrating a method of obtaining path information of a UAV according to an example of the present disclosure. The method of obtaining the path information of the UAV shown in the example may be applicable to a base station, such as a 4G base station, a 5G base station, or the like.

As shown in FIG. 1, the method of obtaining the path information of the UAV may include the following steps.

At step S11, indication information from a UAV is received. The indication information indicates whether the UAV has a capability of sending the path information.

In an example, the UAV may include a drone, an unmanned airship, etc. The drone may include a fixed-wing drone, a vertical take-off and landing drone, an unmanned helicopter, a multi-rotor drone, an unmanned glider, and so on.

In an example, different UAVs have different capabilities. For example, a UAV may communicate with a base station, but the UAV cannot obtain its own path information, such that this UAV does not have the capability of sending the path information. A UAV is capable of communicating with a base station and obtaining its own path information, such that the UAV has the capability of sending the path information. Therefore, a UAV sends the indication information to a base station, such that the base station can determine whether the UAV has the capability of sending the path information, and then the base station can further configure appropriate resources for the UAV to perform an uplink transmission.

It should be noted that the path information may include path information pre-stored by the UAV, or path information received by the UAV from a controller, and the UAV may fly according to the path information.

At step S12, if the UAV has the capability of sending the path information according to the indication information, configuration information is sent to the UAV. The configuration information indicates whether the UAV is allowed to send the path information to the base station.

In an example, although the UAV has the capability of sending the path information, a base station may not be able to receive the path information from the UAV for some reasons. For example, the base station may not have resources to process the path information from the UAV, or the base station may not have available time/frequency resources for the UAV to perform an uplink transmission for the path information.

Therefore, the base station can send the configuration information to the UAV indicating whether the UAV is allowed to send the path information to the base station. For example, if the base station does not have the resources to process the path information from the UAV, it is possible to avoid a situation in which after the UAV sends the path information to the base station, the base station does not perform the processing, resulting in a waste of uplink time/frequency resources.

At step S13, if the UAV is allowed to send the path information to the base station, the path information from the UAV is received.

In an example, the UAV sends the indication information to the base station, such that the base station determines whether the UAV has the capability of sending the path information. In a case that the UAV has the capability of sending the path information, the base station sends the configuration information to the UAV indicating whether the UAV is allowed to send the path information to the base station. Further, in a case that the UAV is allowed to send the path information to the base station, the base station receives the path information from the UAV. Thus, the base station can successfully receive the path information from the UAV.

Figure 2:
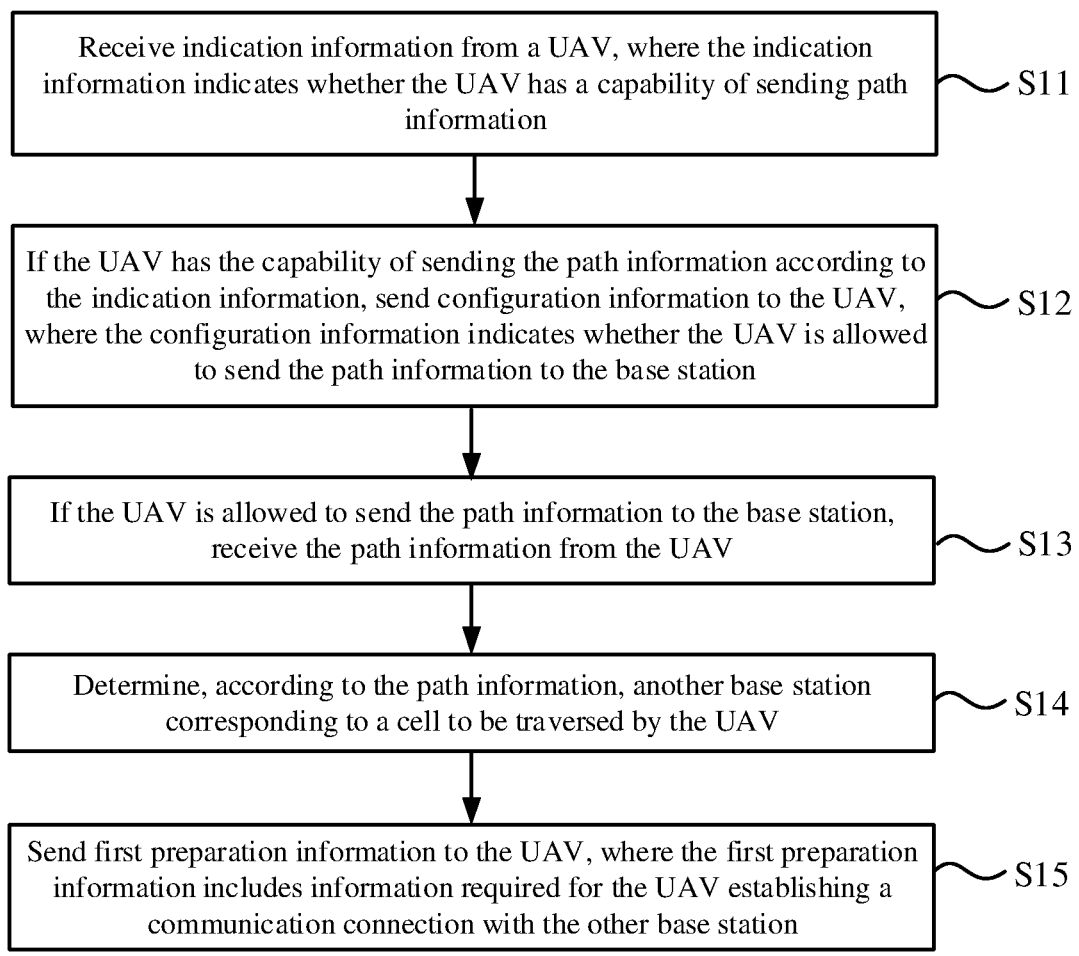
FIG. 2 is a schematic flowchart illustrating another method of obtaining path information of a UAV according to an example of the present disclosure.

FIG. 2 is a schematic flowchart illustrating another method of obtaining path information of a UAV according to an example of the present disclosure. As shown in FIG. 2, on the basis of the example shown in FIG. 1, the method further includes the followings.

At step S14, another base station corresponding to a cell to be traversed by the UAV are determined according to the path information.

At step S15, first preparation information is sent to the UAV. The first preparation information includes information required for the UAV establishing a communication connection with the other base station.

In an example, after receiving the path information from the UAV, the base station may determine a flight path of the UAV according to the path information. The base station may predetermine an area covered by a cell corresponding to another base station. Furthermore, according to the flight path of the UAV and the area covered by the cell corresponding to the other base station, the base station can determine which cell the UAV will pass through when flying along the flight path, and further determine the other base station corresponding to the cell that the UAV will pass through.

In an example, the first preparation information is sent to the UAV, such that the UAV may pre-obtain information required for establishing the communication connection with the other base station before entering the area covered by the cell corresponding to the other base station. For example, according to the received information, a random access preamble for establishing the communication connection with the other base station may be determined, such that the UAV, after entering the cell corresponding to the other base station, may quickly establish the communication connection with the other base station, thereby ensuring good communication quality between the UAV and the other base station.

Figure 3:
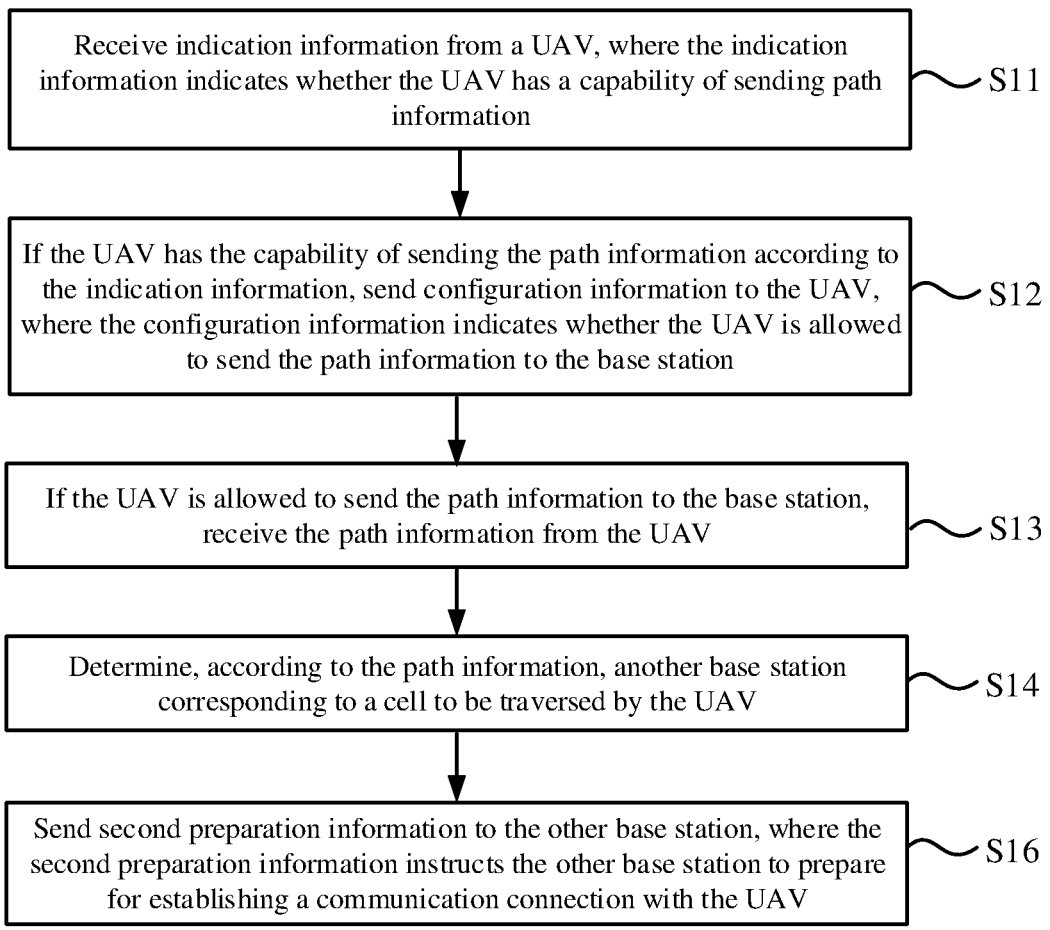
FIG. 3 is a schematic flowchart illustrating still another method of obtaining path information of a UAV according to an example of the present disclosure.

FIG. 3 is a schematic flowchart illustrating still another method of obtaining path information of a UAV according to an example of the present disclosure. As shown in FIG. 3, on the basis of the example shown in FIG. 1, the method further includes the followings.

At step S14, another base station corresponding to a cell to be traversed by the UAV are determined according to the path information.

At step S16, second preparation information is sent to the other base station. The second preparation information instructs the other base station to prepare for establishing a communication connection with the UAV.

In an example, after receiving the path information from the UAV, the base station may determine a flight path of the UAV according to the path information. The base station may predetermine an area covered by a cell corresponding to another base station. Furthermore, according to the flight path of the UAV and the area covered by the cell corresponding to the other base station, the base station can determine which cell the UAV will pass through when flying along the flight path, and further determine the other base station corresponding to the cell that the UAV will pass through.

In an example, by sending the second preparation information to another base station, the other base station can prepare for establishing the communication connection with the UAV in advance before the UAV enters the area covered by the cell corresponding to the other base station. For example, time/frequency resources allocated to the UAV are prepared. Thus, after the UAV enters the cell corresponding to the other base station, the other base station may quickly allocate the time/frequency resources to the UAV, thereby ensuring good communication quality between the UAV and the other base station.

Optionally, the configuration information further indicates a parameter of a mode in which the UAV sends the path information to the base station.

In an example, the configuration information may also be used to indicate the parameter of the mode in which the UAV sends the path information to the base station, such as, a format of the UAV sending the path information to the base station, a time interval of each time the UAV sending the path information to the base station, and so on. In this way, the UAV may send the path information to the base station according to a parameter of a mode suitable for the base station to receive the path information, thereby ensuring that the base station receives the path information successfully.

Optionally, the configuration information is included in RRCConnectionReconfiguration signaling.

In an example, the RRCConnectionReconfiguration signaling mainly includes an information element related to connection reconfiguration. In a case that a communication connection has been established with the UAV, the base station sends the configuration information to the UAV indicating whether the UAV is allowed to send the path information to the base station. If the UAV is not allowed to send the path information to the base station, the connection reconfiguration may be performed. Therefore, the configuration information is related to the connection reconfiguration to some extent, and the configuration information may be sent through the RRCConnectionReconfiguration signaling.

Optionally, the configuration information is included in an OtherConfig information element of the RRCConnectionReconfiguration signaling.

In an example, because there is no information element dedicated for sending the configuration information in the RRCConnectionReconfiguration signaling in the related art, the configuration information may be set in the OtherConfig information element which is not used for sending main signaling, so as to reduce an impact on an existing signaling transmission.

It should be noted that the signaling and information element used for sending the configuration information may be adjusted as required.

Figure 4:
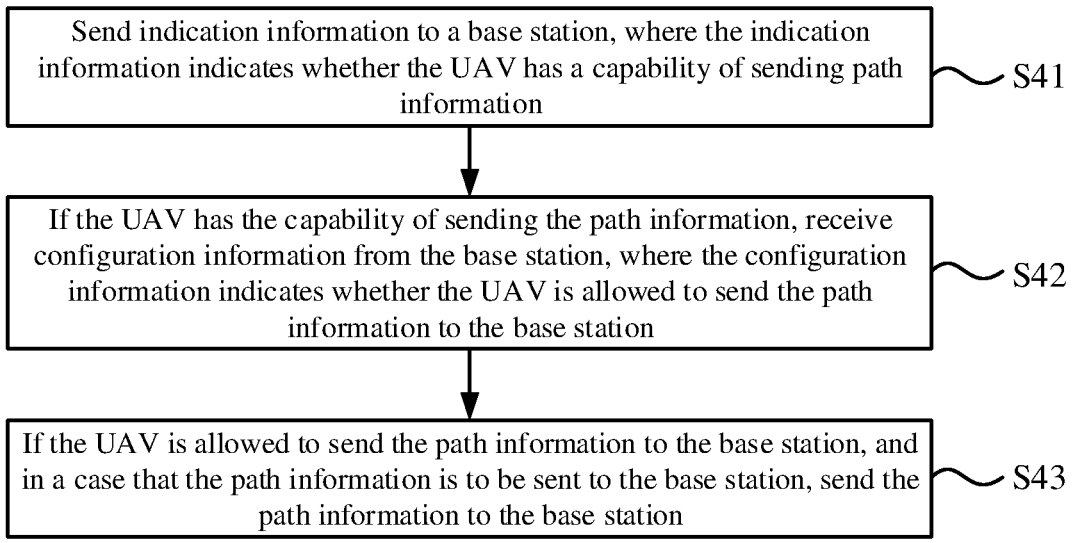
FIG. 4 is a schematic flowchart illustrating a method of sending path information of a UAV according to an example of the present disclosure.

FIG. 4 is a schematic flowchart illustrating a method of sending path information of a UAV according to an example of the present disclosure. The method of sending the path information of the UAV in this example may be applicable to a UAV.

As shown in FIG. 4, the method of sending the path information of the UAV includes the followings.

At step S41, indication information is sent to a base station. The indication information indicates whether the UAV has a capability of sending the path information.

At step S42, if the UAV has the capability of sending the path information, configuration information from the base station is received. The configuration information indicates whether the UAV is allowed to send the path information to the base station.

At step S43, if the UAV is allowed to send the path information to the base station, and in a case that the path information is to be sent to the base station, the path information is sent to the base station.

In an example, corresponding to the example shown in FIG. 1, the UAV sends the indication information to the base station, such that the base station can determine whether the UAV has the capability of sending the path information. In a case that the UAV has the capability of sending the path information, the UAV can determine whether the UAV is allowed to send the path information to the base station by receiving the configuration information from the base station. Furthermore, in a case that the UAV is allowed to send the path information to the base station, the path information can be sent to the base station, such that the base station can successfully receive the path information from the UAV.

It should be noted that in the case that the UAV determines that the base station allows the UAV to send the path information to the base station, the UAV can determine by itself whether it is necessary to send the path information to the base station. For example, according to an identifier of the base station, the UAV determines that the base station is a base station corresponding to a cell that the UAV has passed through. That is, the UAV has already sent the path information to the base station, and then there is no need to send the path information to the base station again. Or, according to an identifier of the base station, the UAV determines that the base station is marked by a user of the UAV as prohibited from sending the path information, and then there is no need to send the path information to the base station.

Optionally, the path information includes pre-stored path information.

In an example, a controller for controlling the UAV may send the path information to the UAV in advance. The UAV may store the received path information, and send the stored path information to the base station if it is determined that the UAV is allowed to send the path information to the base station according to the configuration information.

Optionally, the path information includes path information received from the controller.

In an example, the UAV may periodically receive the path information from the controller, and send the latest received path information to the base station if it is determined that the UAV is allowed to send the path information to the base station according to the configuration information.

Figure 5:
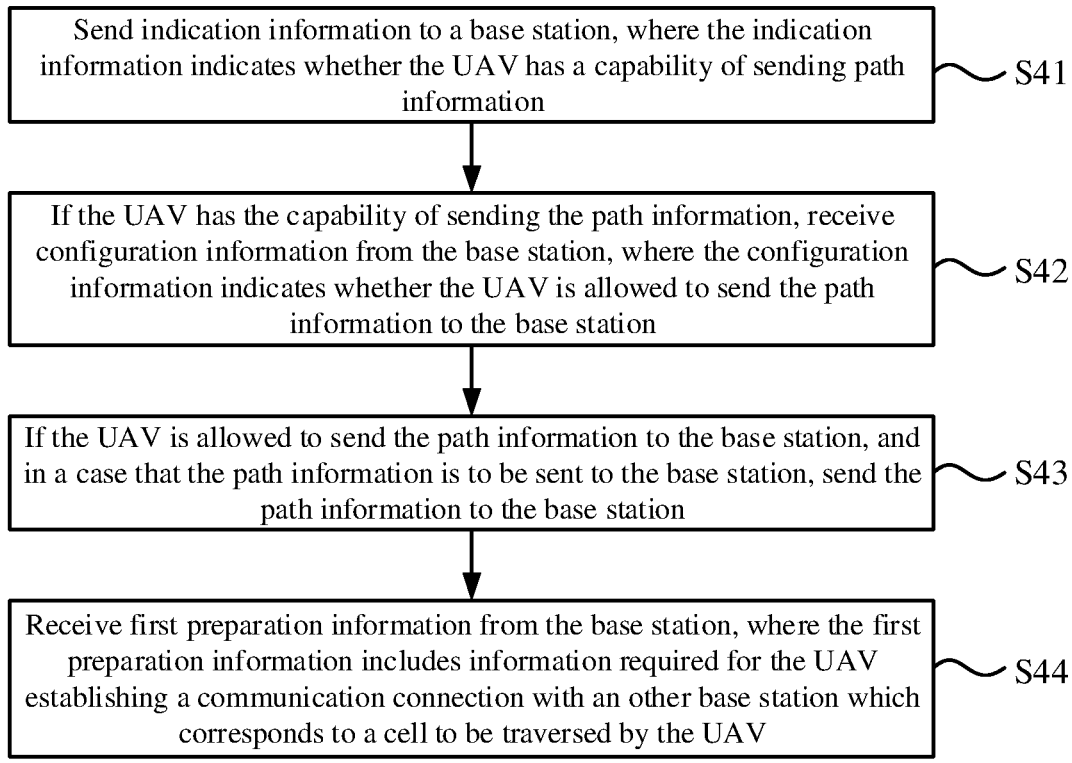
FIG. 5 is a schematic flowchart illustrating another method of sending path information of a UAV according to an example of the present disclosure.

FIG. 5 is a schematic flowchart illustrating another method of sending path information of a UAV according to an example of the present disclosure. As shown in FIG. 5, on the basis of the example shown in FIG. 4, the method further includes the followings.

At step S44, first preparation information from the base station is received. The first preparation information includes information required for the UAV establishing a communication connection with another base station which corresponds to a cell to be traversed by the UAV.

In an example, corresponding to the example shown in FIG. 2, after receiving the path information from the UAV, the base station may determine a flight path of the UAV according to the path information. The base station may predetermine an area covered by a cell corresponding to another base station. Furthermore, according to the flight path of the UAV and the area covered by the cell corresponding to the other base station, the base station can determine which cell the UAV will pass through when flying along the flight path, and further determine the other base station corresponding to the cell that the UAV will pass through.

Further, the UAV may receive the first preparation information from the base station, such that the UAV may pre-obtain information required for establishing the communication connection with the other base station before entering the area covered by the cell corresponding to the other base station. For example, according to the received information, a random access preamble for establishing the communication connection with the other base station may be determined, such that the UAV, after entering the cell corresponding to the other base station, may quickly establish the communication connection with the other base station, thereby ensuring good communication quality between the UAV and the other base station.

Figure 6:
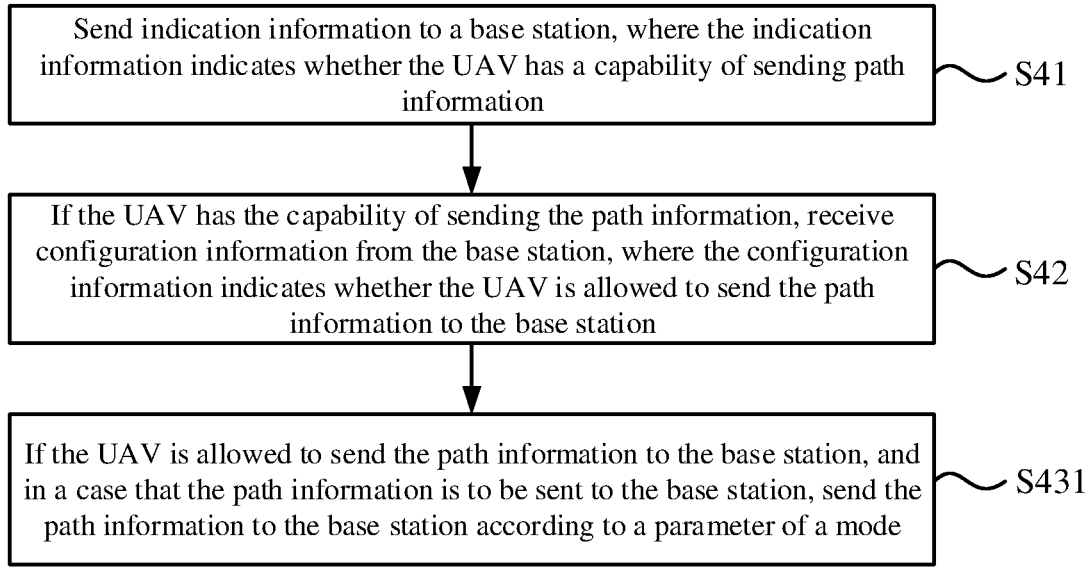
FIG. 6 is a schematic flowchart illustrating still another method of sending path information of a UAV according to an example of the present disclosure.

FIG. 6 is a schematic flowchart illustrating still another method of sending path information of a UAV according to an example of the present disclosure. As shown in FIG. 6, on the basis of the example shown in FIG. 4, the configuration information further indicates a parameter of a mode in which the UAV sends the path information to the base station. Sending the path information to the base station includes the following.

At step S431, the path information is sent to the base station according to the parameter of the mode.

In an example, the configuration information may also be used to indicate the parameter of the mode in which the UAV sends the path information to the base station, such as, a format of the UAV sending the path information to the base station, a time interval of each time the UAV sending the path information to the base station, and so on. In this way, the UAV may send the path information to the base station according to a parameter of a mode suitable for the base station to receive the path information, thereby ensuring that the base station receives the path information successfully.

Optionally, the indication information is included in UE-EUTRA-Capability signaling.

In an example, the indication information indicates whether the UAV has the capability of sending the path information. The UAV is equivalent to user equipment (UE) in communicating with the base station. Therefore, the capability of the UAV for sending the path information, to some extent, belongs to a capability of an air interface between the user equipment and the base station, that is, a capability of Evolved Universal Terrestrial Radio Access (EUTRA). Thus, the indication information may be set in the UE-EUTRA-Capability signaling.

Optionally, the indication information is included in an OtherParameters information element of the UE-EUTRA-Capability signaling.

In an example, because there is no information element dedicated for sending the indication information in the UE-EUTRA-Capability signaling in the related art, the indication information may be set in the OtherParameters information element which is not used for sending main signaling, so as to reduce an impact on an existing signaling transmission.

It should be noted that the signaling and information element used for sending the indication information may be adjusted as required.

Optionally, the path information is included in UEAssistanceInformation signaling.

In an example, since a communication between the UAV and the base station does not necessarily include the path information, the path information belongs to assistance information in the communication between the UAV and the base station. The UAV is equivalent to UE in communicating with the base station, therefore the path information may be set in the UEAssistanceInformation signaling.

Optionally, the path information is included in a FlightPathInformation information element of the UEAssistanceInformation signaling.

In an example, the FlightPathInformation information element belongs to an information element newly established in the UEAssistanceInformation signaling. The name of this information element may be a name other than the FlightPathInformation, and may be specifically set as required. Since the UEAssistanceInformation signaling in the related art does not include an information element dedicated for sending the path information, sending the path information through the newly established information element may reduce an impact on an existing signaling transmission.

It should be noted that the signaling and information element used for sending the path information may be adjusted as required.

Corresponding to the examples of the methods of obtaining the path information of the UAV and the methods of sending the path information of the UAV, the present disclosure further provides examples of apparatuses for obtaining path information of a UAV and apparatuses for sending path information of a UAV.

Figure 7:
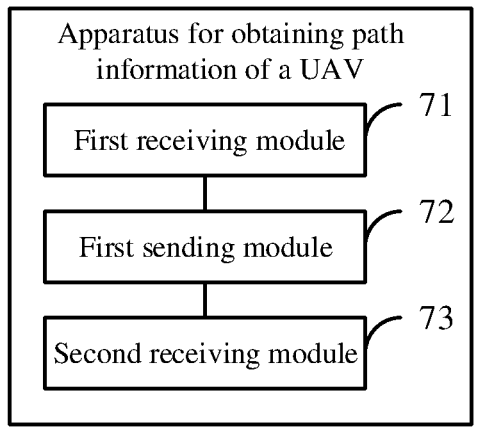
FIG. 7 is a schematic block diagram illustrating an apparatus for obtaining path information of a UAV according to an example of the present disclosure.

FIG. 7 is a schematic block diagram illustrating an apparatus for obtaining path information of a UAV according to an example of the present disclosure. The apparatus for obtaining the path information of the UAV shown in this example may be applicable to a base station, such as a 4G base station, a 5G base station, or the like.

As shown in FIG. 7, the apparatus for obtaining the path information of the UAV may include:

a first receiving module 71 configured to receive indication information from a UAV, where the indication information indicates whether the UAV has a capability of sending path information;

a first sending module 72 configured to, if the UAV has the capability of sending the path information according to the indication information, send configuration information to the UAV, where the configuration information indicates whether the UAV is allowed to send the path information to the base station; and a second receiving module 73 configured to, if the UAV is allowed to send the path information to the base station, receive the path information from the UAV.

Figure 8:
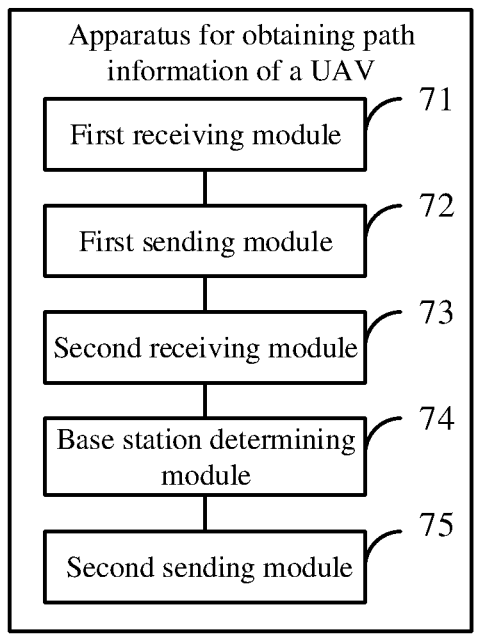
FIG. 8 is a schematic block diagram illustrating another apparatus for obtaining path information of a UAV according to an example of the present disclosure.

FIG. 8 is a schematic block diagram illustrating another apparatus for obtaining path information of a UAV according to an example of the present disclosure. As shown in FIG. 8, on the basis of the example shown in FIG. 7, the apparatus further includes:

a base station determining module 74 configured to determine, according to the path information, another base station corresponding to a cell to be traversed by the UAV; and a second sending module 75 configured to send first preparation information to the UAV, where the first preparation information includes information required for the UAV establishing a communication connection with the other base station.

Figure 9:
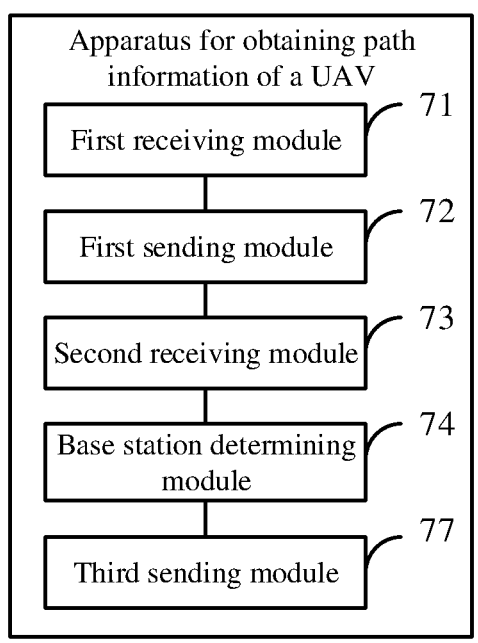
FIG. 9 is a schematic block diagram illustrating still another apparatus for obtaining path information of a UAV according to an example of the present disclosure.

FIG. 9 is a schematic block diagram illustrating still another apparatus for obtaining path information of a UAV according to an example of the present disclosure. As shown in FIG. 9, on the basis of the example shown in FIG. 7, the apparatus further includes:

a base station determining module 74 configured to determine, according to the path information, another base station corresponding to a cell to be traversed by the UAV; and a third sending module 77 configured to send second preparation information to the other base station, where the second preparation information instructs the other base station to prepare for establishing a communication connection with the UAV.

Optionally, the configuration information further indicates a parameter of a mode in which the UAV sends the path information to the base station.

Optionally, the configuration information is included in RRCConnectionReconfiguration signaling.

Optionally, the configuration information is included in an OtherConfig information element of the RRCConnectionReconfiguration signaling.

Figure 10:
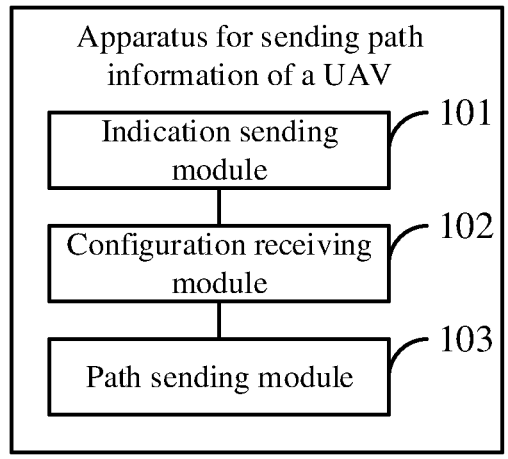
FIG. 10 is a schematic block diagram illustrating an apparatus for sending path information of a UAV according to an example of the present disclosure.

FIG. 10 is a schematic block diagram illustrating an apparatus for sending path information of a UAV according to an example of the present disclosure. The apparatus for sending the path information of the UAV shown in this example may be applicable to a UAV.

As shown in FIG. 10, the apparatus for sending the path information of the UAV includes:

an indication sending module 101 configured to send indication information to a base station, where the indication information indicates whether the UAV has a capability of sending path information;

a configuration receiving module 102 configured to, if the UAV has the capability of sending the path information, receive configuration information from the base station, where the configuration information indicates whether the UAV is allowed to send the path information to the base station; and a path sending module 103 configured to, if the UAV is allowed to send the path information to the base station, and in a case that the path information is to be sent to the base station, send the path information to the base station.

Optionally, the path information includes pre-stored path information.

Optionally, the path information includes path information received from a controller.

Figure 11:
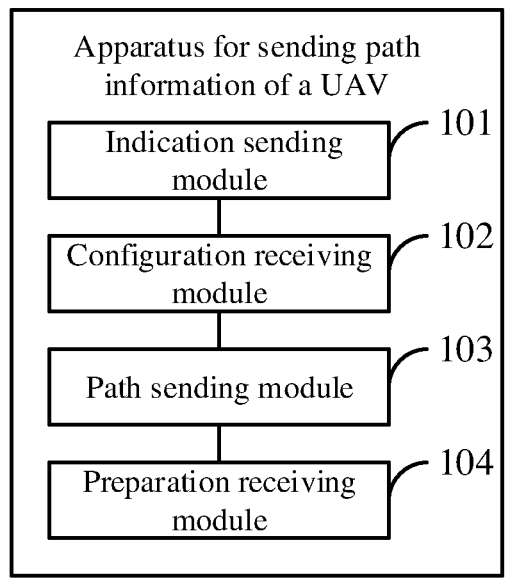
FIG. 11 is a schematic block diagram illustrating another apparatus for sending path information of a UAV according to an example of the present disclosure.

FIG. 11 is a schematic block diagram illustrating another apparatus for sending path information of a UAV according to an example of the present disclosure. As shown in FIG. 11, the apparatus further includes:

a preparation receiving module 104 configured to receive first preparation information from the base station, where the first preparation information includes information required for the UAV establishing a communication connection with another base station which corresponds to a cell to be traversed by the UAV.

Optionally, the path sending module is configured to send the path information to the base station according to a parameter of a mode.

Optionally, the indication information is included in UE-EUTRA-Capability signaling.

Optionally, the indication information is included in an OtherParameters information element of the UE-EUTRA-Capability signaling.

Optionally, the path information is included in UEAssistanceInformation signaling.

Optionally, the path information is included in a FlightPathInformation information element of the UEAssistanceInformation signaling.

With respect to the apparatuses in the above examples, the specific manner in which each module performs operations has been described in detail in the examples of the related methods, and will not be elaborated here.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, e.g., may be located in one place or may be distributed to multiple network units. Some or all of the modules may be selected according to actual needs to achieve the objectives of the present disclosure. Those of ordinary skill in the art can understand and implement the present disclosure without any creative effort.

An example of the present disclosure further provides an electronic device, including:

a processor; and a memory for storing instructions executable by the processor, where the processor is configured to perform steps in a method of obtaining path information of a UAV according to any one of the examples as described above.

An example of the present disclosure further provides an electronic device, including:

a processor; and a memory for storing instructions executable by the processor, where the processor is configured to perform steps in a method of sending path information of a UAV according to any one of the examples as described above.

An example of the present disclosure further provides a computer readable storage medium storing a computer program, where the program is executed by a processor to perform steps in a method of obtaining path information of a UAV according to any one of the examples as described above.

An example of the present disclosure further provides a computer readable storage medium storing a computer program, where the program is executed by a processor to perform steps in a method of sending path information of a UAV according to any one of the examples as described above.

Figure 12:
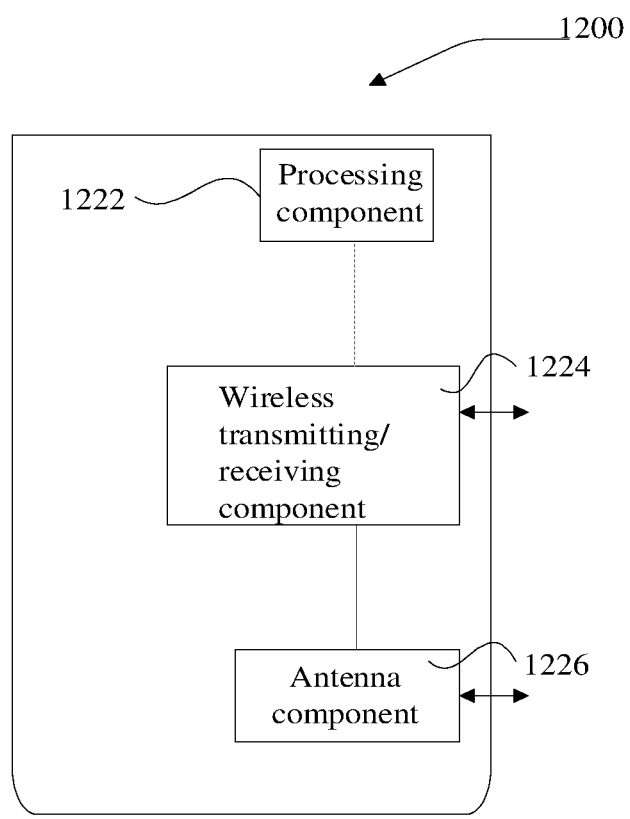
FIG. 12 is a schematic block diagram illustrating an apparatus for obtaining path information of a UAV according to an example of the present disclosure.

FIG. 12 is a schematic block diagram illustrating an apparatus 1200 for obtaining path information of a UAV according to an example of the present disclosure. The apparatus 1200 may be provided to a base station. Referring to FIG. 12, the apparatus 1200 includes a processing component 1222, a wireless transmitting/receiving component 1224, an antenna component 1226, and a signal processing portion specific to a wireless interface. The processing component 1222 may further include one or more processors. One of the processors in the processing component 1222 may be configured to perform steps in a method of obtaining path information of a UAV according to any one of the examples as described above.

Figure 13:
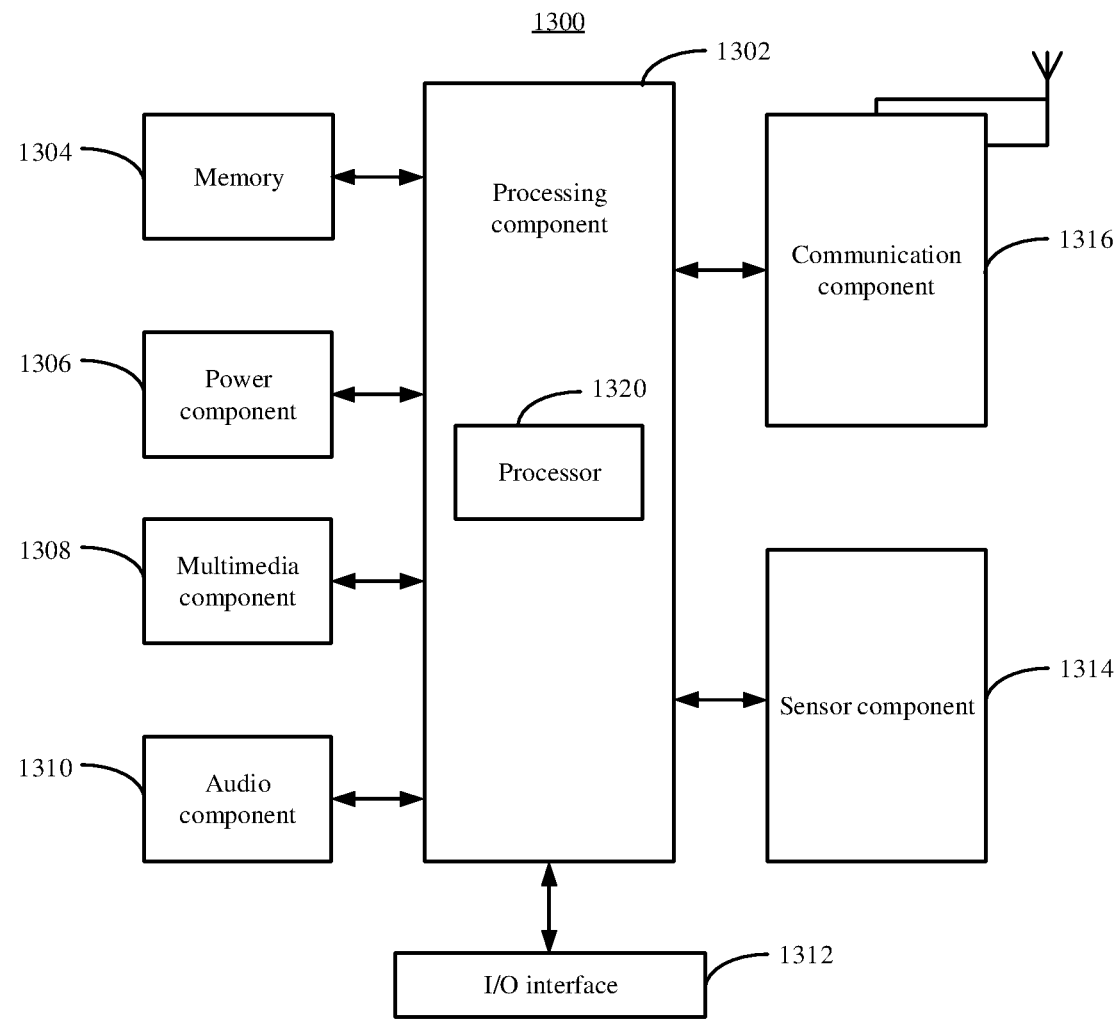
FIG. 13 is a schematic block diagram illustrating an apparatus for sending path information of a UAV according to an example of the present disclosure.

FIG. 13 is a schematic block diagram illustrating an apparatus 1300 for sending path information of a UAV according to an example of the present disclosure. For example, the apparatus 1300 may be a mobile phone, a computer, a digital broadcast terminal, a messaging device, a game console, a tablet device, a medical equipment, a fitness equipment, a personal digital assistant, etc.

Referring to FIG. 13, the apparatus 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 usually controls the overall operation of the apparatus 1300, such as operations associated with display, telephone calls, data communications, camera operations, and recording operations. The processing component 1302 may include one or more processors 1320 to execute instructions to perform all or part of the steps in the methods described above. Moreover, the processing component 1302 may include one or more modules to facilitate interaction between the processing component 1302 and other components. For example, the processing component 1302 may include a multimedia module to facilitate interaction between the multimedia component 1308 and the processing component 1302.

The memory 1304 is configured to store various types of data to support operation at the apparatus 1300. Examples of these data include instructions for any application or method operating at the apparatus 1300, contact data, phone book data, messages, pictures, videos, and the like. The memory 1304 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1306 provides power to various components of the apparatus 1300. The power component 1306 may include a power management system, one or more power sources, and other components associated with power generated, managed, and distributed for the apparatus 1300.

The multimedia component 1308 includes a screen that provides an output interface between the apparatus 1300 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1308 includes a front camera and/or a rear camera. When the apparatus 1300 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1310 is configured to output and/or input audio signals. For example, the audio component 1310 includes a microphone (MIC) configured to receive an external audio signal when the apparatus 1300 is in an operation mode, such as a call mode, a recording mode, and a voice recognition mode. The received audio signal may be further stored in the memory 1304 or transmitted via the communication component 1316. In some examples, the audio component 1310 also includes a loudspeaker for outputting an audio signal.

The I/O interface 1312 provides an interface between the processing component 1302 and a peripheral interface module which may be a keyboard, a click wheel, a button, or the like. These buttons may include, but are not limited to a home button, a volume button, a start button, and a lock button.

The sensor component 1314 includes one or more sensors for providing a status assessment in various aspects to the apparatus 1300. For example, the sensor component 1314 may detect an open/closed state of the apparatus 1300, and the relative positioning of components, for example, the component is a display and a keypad of the apparatus 1300. The sensor component 1314 may also detect a change in position of the apparatus 1300 or a component of the apparatus 1300, the presence or absence of a user in contact with the apparatus 1300, the orientation or acceleration/deceleration of the apparatus 1300 and a change in temperature of the apparatus 1300. The sensor component 1314 may include a proximity sensor configured to detect the presence of nearby objects without any physical contact. The sensor component 1314 may also include a light sensor, such as a CMOS or CCD image sensor, for use in imaging applications. In some examples, the sensor component 1314 may also include an acceleration sensor, a gyro sensor, a magnetic sensor, a pressure sensor, or a temperature sensor.

The communication component 1316 is configured to facilitate wired or wireless communication between the apparatus 1300 and other devices. The apparatus 1300 may access a wireless network based on a communication standard, such as WiFi, 2G or 3G, or a combination thereof. In an example, the communication component 1316 receives broadcast signals or broadcast associated information from an external broadcast management system via a broadcast channel In an example, the communication component 1316 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1300 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing steps in a method of sending path information of a UAV according to any of the examples as described above.

In an example, there is also provided a non-transitory computer readable storage medium including instructions, such as a memory 1304 including instructions, where the instructions are executable by the processor 1320 of the apparatus 1300 to perform the method as described above. For example, the non-transitory computer readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of obtaining path information of an unmanned aerial vehicle (UAV), being applicable to a base station, and comprising:
    receiving indication information from the UAV, wherein the indication information indicates whether the UAV has a capability of sending path information;
    in response to that the UAV has the capability of sending the path information according to the indication information, sending configuration information to the UAV, wherein the configuration information indicates whether the UAV is allowed to send the path information to the base station, and the configuration information is comprised in RRCConnectionReconfiguration signaling; and
    in response to that the UAV is allowed to send the path information to the base station, receiving the path information from the UAV.

2. The method according to claim 1, wherein the base station is a first base station, the method further comprising:
    determining, according to the path information, a second base station corresponding to a cell to be traversed by the UAV; and
    sending preparation information to the UAV, wherein the preparation information comprises information required for the UAV establishing a communication connection with the second base station.

3. The method according to claim 1, wherein the base station is a first base station, the method further comprising:
    determining, according to the path information, a second base station corresponding to a cell to be traversed by the UAV; and
    sending preparation information to the second base station, wherein the preparation information instructs the second base station to prepare for establishing a communication connection with the UAV.

4. The method according to claim 1, wherein the configuration information further indicates a parameter of a mode in which the UAV sends the path information to the base station.

5. The method according to claim 1, wherein the configuration information is comprised in an OtherConfig information element of the RRCConnectionReconfiguration signaling.

6. An electronic device, comprising:
    a processor, and
    a memory for storing instructions executable by the processor,
    wherein the processor is configured to perform the method according to claim 1.

7. The method according to claim 1, wherein an information element of the configuration information indicates whether the UAV is allowed to send the path information to the base station.

8. The method according to claim 1, wherein the configuration information indicates that the UAV is not allowed to send the path information to the base station in response to the base station not being able to receive the path information from the UAV; and
    in response to that the UAV is allowed to send the path information to the base station, receiving the path information from the UAV comprises:
    in response to that the UAV is allowed to send the path information to the base station and in a case that the path information is to be sent to the base station, receiving the path information from the UAV.

9. A method of sending path information of an unmanned aerial vehicle (UAV), being applicable to the UAV, and comprising:
sending indication information to a base station, wherein the indication information indicates whether the UAV has a capability of sending path information;
in response to that the UAV has the capability of sending the path information, receiving configuration information from the base station, wherein the configuration information indicates whether the UAV is allowed to send the path information to the base station, and the configuration information is comprised in RRCConnectionReconfiguration signaling; and
in response to that the UAV is allowed to send the path information to the base station, and in a case that the path information is to be sent to the base station, sending the path information to the base station.

10. The method according to claim 9, wherein the path information comprises pre-stored path information.

11. The method according to claim 9, wherein the path information comprises path information received from a controller.

12. The method according to claim 9, wherein
the configuration information further indicates a parameter of a mode in which the UAV sends the path information to the base station, and
sending the path information to the base station comprises:
sending the path information to the base station according to the parameter of the mode.

13. The method according to claim 9, wherein the indication information is comprised in UE-EUTRA-Capability signaling.

14. The method according to claim 13, wherein the indication information is comprised in an OtherParameters information element of the UE-EUTRA-Capability signaling.

15. The method according to claim 9, wherein the path information is comprised in UEAssistanceInformation signaling.

16. The method according to claim 15, wherein the path information is comprised in a FlightPathInformation information element of the UEAssistanceInformation signaling.

17. The method according to claim 9, wherein the configuration information is comprised in an OtherConfig information element of the RRCConnectionReconfiguration signaling.

18. An electronic device, comprising:
a processor, and
a memory for storing instructions executable by the processor,
wherein the processor is configured to:
send indication information to a base station, wherein the indication information indicates whether an unmanned aerial vehicle (UAV) has a capability of sending path information;
in response to that the UAV has the capability of sending the path information, receive configuration information from the base station, wherein the configuration information indicates whether the UAV is allowed to send the path information to the base station, and the configuration information is comprised in RRCConnectionReconfiguration signaling; and
in response to that the UAV is allowed to send the path information to the base station, and in a case that the path information is to be sent to the base station, send the path information to the base station.

19. The electronic device according to claim 18, wherein the path information comprises one of: pre-stored path information or path information received from a controller.

20. The electronic device according to claim 18, wherein the configuration information further indicates a parameter of a mode in which the UAV sends the path information to the base station, and in sending the path information to the base station, the processor is further configured to:
send the path information to the base station according to the parameter of the mode.

* * * * *